United States Patent
Kato

(10) Patent No.: US 6,814,512 B2
(45) Date of Patent: Nov. 9, 2004

(54) APPARATUS AND METHOD FOR MANAGING IMAGE FORMING JOB

(75) Inventor: Atushi Kato, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/023,858

(22) Filed: Dec. 21, 2001

(65) Prior Publication Data

US 2003/0118386 A1 Jun. 26, 2003

(51) Int. Cl.⁷ .......................... B41J 11/44; G06F 15/00
(52) U.S. Cl. ...................................... 400/76; 358/1.15
(58) Field of Search .................................. 358/1.16, 1.17,
358/115, 1.9, 1.14, 468; 400/76, 61, 70;
709/200, 201, 202, 203, 213, 214, 220,
223, 224, 225–232

(56) References Cited

U.S. PATENT DOCUMENTS

| | | | | |
|---|---|---|---|---|
| 5,580,177 A | * | 12/1996 | Gase et al. | 400/61 |
| 5,802,260 A | * | 9/1998 | Shimakawa et al. | 358/1.15 |
| 5,832,301 A | * | 11/1998 | Yamaguchi | 710/48 |
| 5,933,584 A | * | 8/1999 | Maniwa | 358/1.15 |
| 6,115,132 A | * | 9/2000 | Nakatsuma et al. | 358/1.14 |
| 6,188,487 B1 | * | 2/2001 | Matsubara | 358/1.15 |
| 6,246,486 B1 | * | 6/2001 | Takahashi | 358/1.13 |
| 6,474,881 B1 | * | 11/2002 | Wanda | 400/61 |
| 6,567,177 B2 | * | 5/2003 | Matsuyama | 358/1.14 |
| 6,631,008 B2 | * | 10/2003 | Aoki | 358/1.15 |
| 6,678,068 B1 | * | 1/2004 | Richter et al. | 358/1.15 |
| 2002/0042263 A1 | * | 4/2002 | Ishikawa | 455/412 |

FOREIGN PATENT DOCUMENTS

| JP | 10078858 | * 9/1996 |
|---|---|---|
| JP | 11-95942 | 4/1999 |

* cited by examiner

Primary Examiner—N. Le
Assistant Examiner—Hoai-An D. Nguyen
(74) Attorney, Agent, or Firm—Foley & Lardner LLP

(57) ABSTRACT

An image-forming-job managing apparatus includes a communication section which executes communication with at least one second image-forming apparatus connected thereto via a communication line, and a job storage which sequentially stores image-forming jobs issued from a terminal. Upon receiving a request for displaying the image-forming jobs stored in the job storage, the image-forming-job managing apparatus displays, on a display, information contained in the image-forming jobs. Upon receiving a request for changing an output destination of one of the image-forming jobs stored in the job storage, the image-forming-job managing apparatus extracts the one of the image-forming jobs, and transfers it, via the communication section, to the second image-forming apparatus designated as the output destination.

20 Claims, 6 Drawing Sheets

| Printer name | |
|---|---|
| Status | |
| Number of jobs waiting for printing | |
| Printer - installed place | |
| Sheet size | |
| Sheet supply method | |

APPARATUS AND METHOD FOR MANAGING IMAGE FORMING JOB

BACKGROUND OF THE INVENTION

1. Field of the Invention

The present invention relates to an image-forming job managing apparatus for managing an image-forming job issued from at least one terminal to an image-forming apparatus.

2. Description of the Related Art

An image-forming system is now being proposed, in which a plurality of servers for controlling printers with an image-forming function and a plurality of client terminals, such as personal computers, are connected to a LAN (Local Area Network).

In the image-forming system, when a user operates their client terminal to issue an instruction to print out a document, they designate a destination printer. At this time, an image-forming job is issued from the client computer to the server of the printer designated as a destination. The image-forming job includes, as well as data to be actually printed, information such as a document name, a sheet size, a print range, the number of copies and a magnification, etc.

Each server registers, in a queue, image-forming jobs issued from client terminals and manages them. Each server controls a printer in its charge on the basis of the image-forming jobs registered in the queue, thereby causing each printer to execute an image-forming process.

In this image-forming system, a list of image-forming jobs registered in the queue in a server can be displayed on the display of a client terminal, or information, such as the number of copies, included in an image-forming-job can be changed using a client terminal.

However, in the image-forming system, image-forming jobs registered in the queue in a server cannot be transferred to another server. Accordingly, if, for example, a user comes to be aware of their erroneous designation of a printer after they issue an instruction to print out a document, they must change the designated printer in a complicated procedure as described below.

First, the user accesses the server of the printer erroneously designated from their client terminal, thereby displaying a list of image-forming jobs on the display of the client terminal. After that, the user selects the image-forming job addressed to the wrong destination, and instructs the server to stop the job. As a result, the accessed server stops the image-forming job.

Subsequently, the user calls for, to the client terminal, the document included in the image-forming job addressed to the wrong destination. Then, the user again instructs the terminal to print out the document. At this time, the user designates a correct printer as a destination. As a result, an image-forming job is issued to the server of the printer designated as the destination, whereby the printer executes a document copying process on the basis of the image-forming job.

In the light of the above, there is a need for providing an image-forming job managing apparatus for managing an image-forming job issued from at least one terminal to an image-forming apparatus, which can transfer, by a simple procedure, an image-forming job to another image-forming job managing apparatus on a network.

BRIEF SUMMARY OF THE INVENTION

A plurality of embodiments of the present invention provide an image-forming-job managing apparatus for managing image-forming jobs issued from at least one terminal to a first image-forming apparatus, the image-forming-job managing apparatus comprising: a communication section configured to execute communication with at least a second image-forming apparatus connected thereto via a communication line; a job storage configured to sequentially store the image-forming jobs issued from the terminal; a job display control section configured to display, on a display, information contained in the image-forming jobs that are stored in the job storage, upon receiving a request for displaying the image-forming jobs; and a job transfer section configured to extract one of the image-forming jobs stored in the job storage, upon receiving a request for changing an output destination of the one of the image-forming jobs, thereby transferring it to the second image-forming apparatus designated as the output destination, via the communication section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate embodiments of the invention, and together with the general description given above and the detailed description of the embodiments given below, serve to explain the principles of the invention.

DETAILED DESCRIPTION OF THE INVENTION

Figure 1:
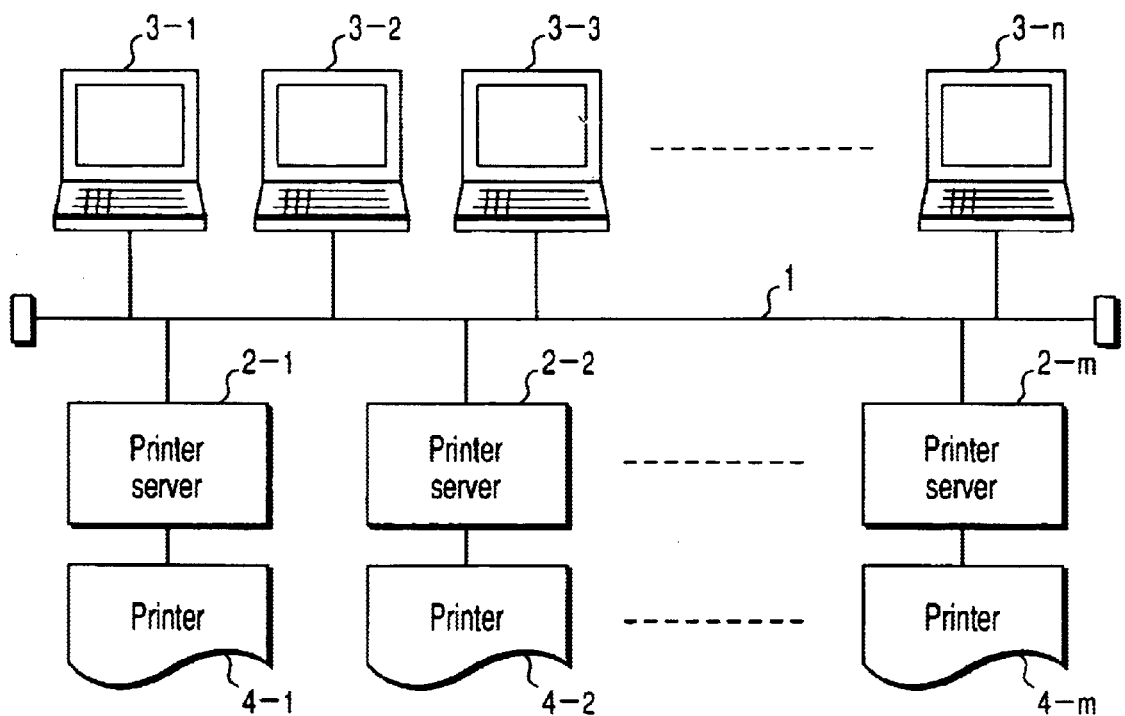
FIG. 1 is a block diagram illustrating an essential configuration of an image-forming system including an image-forming job managing apparatus according to an embodiment of the invention.

Referring first to FIG. 1, a description will be given of an essential configuration of an image-forming system including an image-forming job managing apparatus according to an embodiment of the invention.

In this image-forming system, a plurality of printer servers 2-1, 2-2, ..., 2-m are connected to a plurality of client terminals 3-1, 3-2, 3-3, ..., 3-n via a LAN 1. Printers 4-1, 4-2, ..., 4-m having respective image-forming functions are connected to the printer servers 2-1, 2-2, ..., 2-m, respectively.

In this image-forming system, when each client terminal 3-1-3-n has been instructed to print out a document, it creates an image-forming job for the document. After that, each client terminal 3-1-3-n transmits, via the LAN 1, the image-forming job to the printer server 2-1-2-m of a printer 4-1-4-m designated as a destination. The printer server 2-1 2-m, in turn, registers the received image-forming job in a queue and manages it. Subsequently, the printer server 2-1-2-m controls a corresponding printer 4-1-4-m on the basis of the image-forming job registered in the queue, thereby causing the printer to execute an image-forming process.

Figure 2:
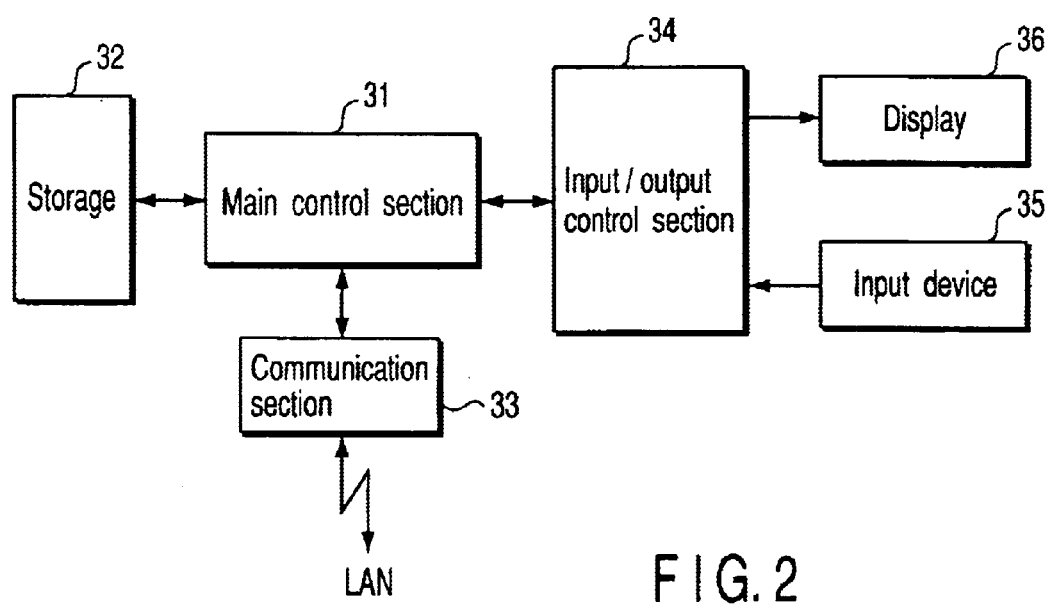
FIG. 2 is a block diagram illustrating an essential configuration of a client terminal appearing in FIG. 1.

Referring then to the block diagram of FIG. 2, an essential configuration of each client terminal 3-1-3-n will be described.

Each client terminal 3-1-3-n at least includes a main control section 31, a storage 32, a communication section 33 and an input/output control section 34, and is formed of, for example, a personal computer.

The main control section 31 controls each section so as to realize its function as a client terminal. The storage 32 stores programs, data and documents, etc. The communication section 33 executes communication of data via the LAN 2. The input/output control section 34 controls an input device 35 such as a keyboard, a mouse, etc., and a display 36.

Figure 3:
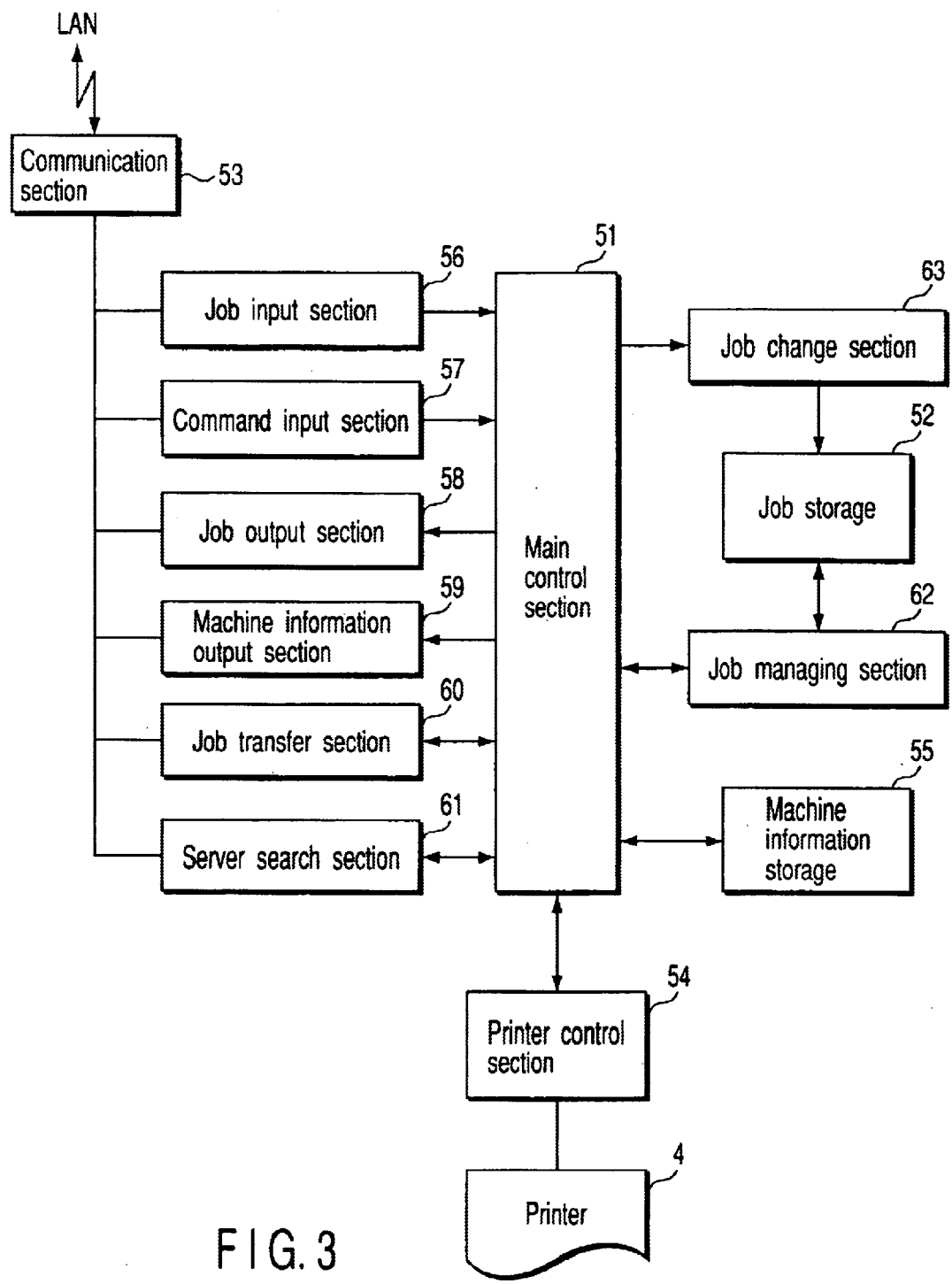
FIG. 3 is a block diagram illustrating an essential configuration of a printer server appearing in FIG. 1.

Referring to the block diagram of FIG. 3, an essential configuration of each printer server 2-1-2-m will be described.

Each printer server 2-1-2-m at least includes a main control section 51, a job storage 52, a communication section 53, a printer control section 54, a machine information storage 55, a job input section 56, a command input section 57, a job output section 58, a machine information output section 59, a job transfer section 60, a server search section 61, a job managing section 62 and a job change section 63. Each printer server functions as an image-forming job managing apparatus.

The main control section 51 controls each section so as to realize the function as the printer server. The job storage 52 is configured to sequentially store image-forming jobs issued from each client terminal 3-1-3-n, and functions as a queue. The communication section 53 executes communication of data via the LAN 2. The printer control section 54 controls the printing operation of a printer 4 in its charge. The machine information storage 55 stores machine information on the printer in its charge.

Figures 4, 5:
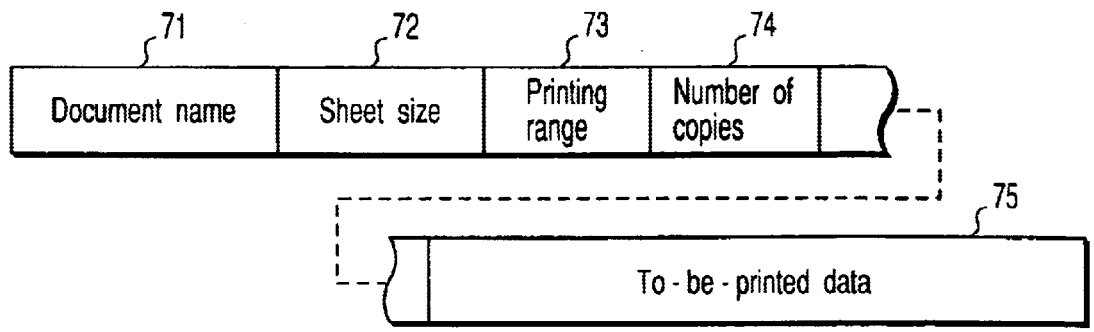
FIG. 4 is a main structure of an image-forming job stored in a job storage appearing in FIG. 3.
FIG. 5 is a view illustrating an essential structure of machine information stored in a machine information storage appearing in FIG. 3.

The job storage 52 stores, as shown in, for example, FIG. 4, an image-forming job that is formed of print control information such as a document name 71, a sheet size 72, a printing range 73 and the number of copies 74, etc., and print data (document) 75 to be actually printed.

The machine information storage 53 stores, as shown in, for example, FIG. 5, machine information concerning each printer 4, such as "printer name", "status" (an idling state, a printing state, an error, etc.), "the number of jobs waiting for printing", "installed place", "sheet size" and "sheet supply method", etc.

The job input section 56 fetches an image-forming job from data received by the communication section 53, and supplies it to the main control section 51. The command input section 57 inputs a command from data received by the communication section 53, and supplies it to the main control section 51. The job output section 58 supplies the communication section 53 with information that concerns the image-forming job and is supplied from the main control section 51, thereby causing the communication section 53 to transmit it, via the LAN 1, to a client terminal as a request originator. The machine information output section 59 supplies the communication section 53 with machine information supplied from the main control section 51, thereby causing the communication section 53 to transmit it, via the LAN 1, to the client terminal as the request originator.

The job transfer section 60 supplies the communication section 53 with the image-forming job supplied from the main control section 51, thereby causing the communication section 53 to transmit it, via the LAN 1, to another printer server. The server search section 61 searches for machine information stored in other printer servers on the LAN 1. The job managing section 62 registers an image-forming job in the job storage 52, or reads image-forming-job information from the job storage 52. The job change section 63 changes image-forming-job information stored in the job storage 52.

Referring then to the flowcharts of FIGS. 6–10, an essential operation of the main control section 51 in each printer server 2-1-2-m will be described.

Figure 6:
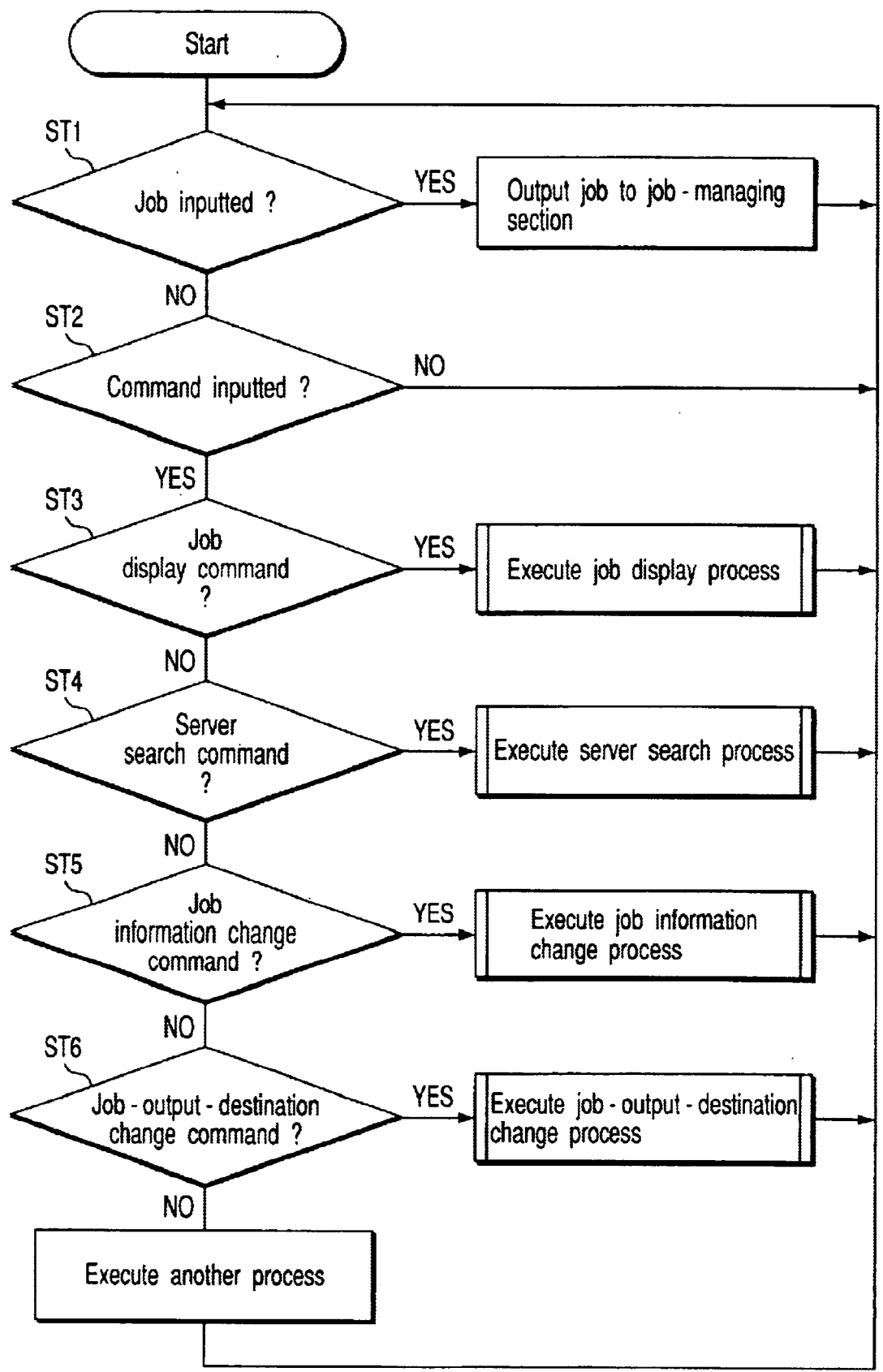
FIG. 6 is a flowchart illustrating a main process executed by a main control section appearing in FIG. 3.
Figure 7:
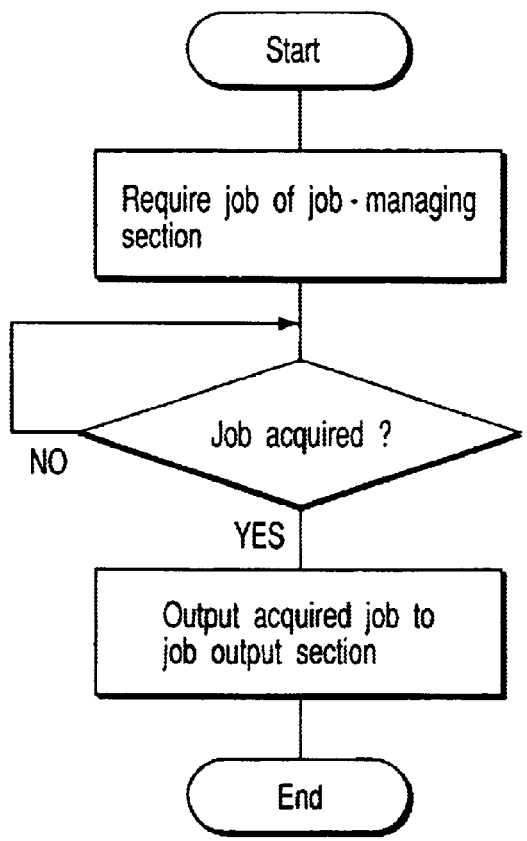
FIG. 7 is a flowchart specifically illustrating a job display process appearing in FIG. 6.

When the main control section 51 has received an image-forming job from the job input section 56 at a step ST1 in FIG. 6, it outputs the image-forming job to the job managing section 62.

When the main control section 51 has received a command from the command input section 57 at a step ST2 in FIG. 6, it analyzes the command. If it determines, at a step ST3 in FIG. 6, that the command is a command to display a job, the main control section 51 executes a job display process shown in detail in FIG. 7. Specifically, the main control section 51 requires print control information for an image-forming job of the job managing section 62. After acquiring the print control information for the image-forming job from the job managing section 62, the main control section 51 outputs, to the job output section 58, the acquired print control information for the image-forming job.

Figure 8:
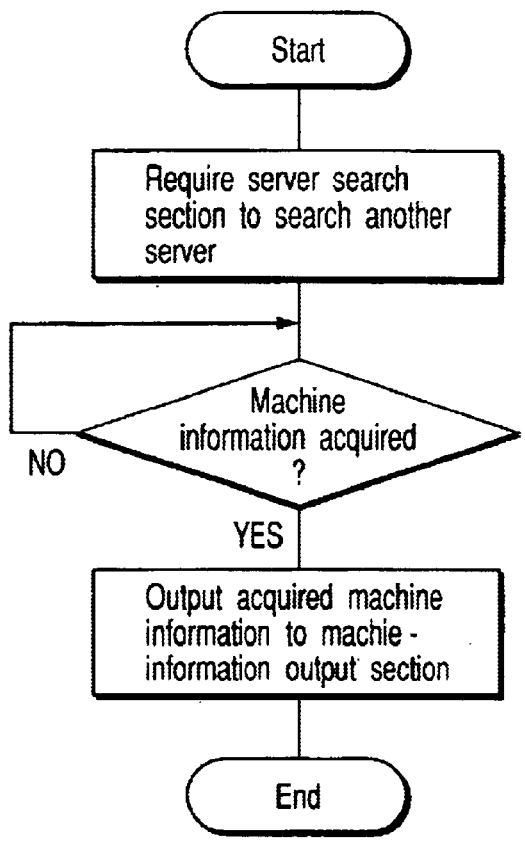
FIG. 8 is a flowchart specifically illustrating a server search process appearing in FIG. 6.

If the main control section 51 determines, at a step ST4 in FIG. 6, that the command is a command to search for a server, it executes a server search process shown in detail in FIG. 8. Specifically, the main control section 51 instructs the server search section 61 to search for another printer server. After acquiring the machine information of another printer server from the server search section 61, the main control section 51 outputs the acquired machine information to the machine information output section 59.

Figure 9:
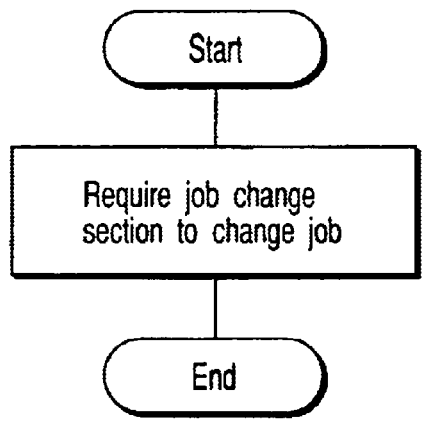
FIG. 9 is a flowchart specifically illustrating a job-information-changing process appearing in FIG. 6.
Figure 10:
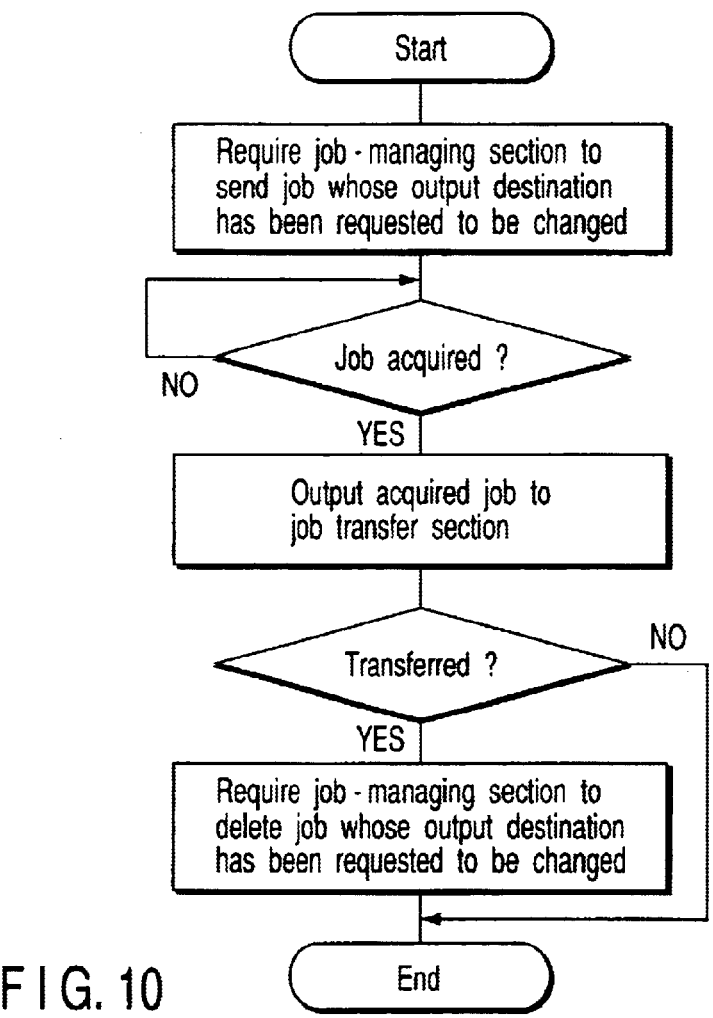
FIG. 10 is a flowchart specifically illustrating a job-output-destination changing process appearing in FIG. 6.

If the main control section 51 determines, at a step ST5 in FIG. 6, that the command is a command to change job information, it executes a job information change process shown in detail in FIG. 9. Specifically, the main control section 51 instructs the job change section 63 to change the image-forming job on the basis of the command.

If the main control section 51 determines, at a step ST6 in FIG. 6, that the command is a command to change a job output destination, it executes a job-output-destination change process shown in detail in FIG. 9. Specifically, the main control section 51 requires, of the job managing section 62, an image-forming job whose output destination has been requested to be changed. After acquiring the image-forming job from the job managing section 62, the main control section 51 outputs the acquired image-forming job to the job transfer section 60. Then, the main control section 51 instructs the job transfer section 60 to transfer the image-forming job to another printer server.

Subsequently, the main control section 51 determines whether or not the image-forming job output to the job transfer section 60 has been correctly transferred to another printer server. If the main control section 51 confirms that the image-forming job has been correctly transferred, it instructs the job managing section 62 to delete the image-forming job whose output destination has been requested to be changed. If the main control section 51 does not confirm that the image-forming job has been correctly transferred, it does not instruct the job managing section 62 to delete the image-forming job.

The operation of the image-forming system of the embodiment will be described.

Suppose, for example, that the user has operated the input device 35 of the client terminal 3-1 to thereby designate the printer 4-1 as an output determination, and then instruct the printer to print out a document. At this time, in the client terminal 3-1, the main control section 31 creates an image-forming job for the document and outputs it to the communication section 33. The communication section 33 transmits the image-forming job to the printer server 2-1 via the LAN 1.

In the printer server 2-1, the job input section 56 fetches the image-forming job and supplies it to the main control section 51. The main control section 51, in turn, outputs the image-forming job to the job managing section 62. The job managing section 62 registers the image-forming job in the job storage 52 and manages it.

After that, suppose that the user has operated the input device 35 of the client terminal 3-1 to thereby request the display of an image-forming job registered in the printer server 2-1. Then, in the client terminal 3-1, the main control section 31 creates a job display command to be supplied to the printer server 2-1, and outputs it to the communication section 33. The communication section 33 transmits the job display command to the printer server 2-1 via the LAN 1.

In the printer server 2-1, the command input section 57 inputs the job display command and supplies it to the main control section 51. The main control section 51, in turn, requires print control information corresponding to the image-forming job, of the job managing section 62. The job managing section 62 fetches the print control information corresponding to all image-forming jobs registered in the job storage 52, and supplies it to the main control section 51. The main control section 51 edits the information received from the job managing section 62, and outputs it to the job output section 58. The job output section 58 outputs the information received from the main control section 51, to the communication section 53. The communication section 53 transmits, via the LAN 1, the information received from the job output section 58, to the client terminal 3-1 as the originator of the job display command.

As a result, a list of all image-forming jobs registered in a queue in the printer server 2-1 is displayed on the display 36 of the client terminal 3-1. In this state, the user of the client terminal 3-1 can change, for example, the number of copies of a document, whose printing was instructed before. Further, the user can change the printer designated as the output destination.

When changing, for example, the number of copies, the user operates the input device 35 to select image-forming-job information, the number of copies of which is changed, from a list of information displayed on the display 36. After that, the user operates the input device 35 to change the number of copies contained in the selected information. As a result, in the client terminal 3-1, the main control section 31 creates a job-information change command for changing the number of copies of the selected information, and outputs it to the communication section 33. The communication section 33 transmits the job-information change command to the printer server 2-1 via the LAN 1.

In the printer server 2-1, the command input section 57 inputs the job-information change command and supplies it to the main control section 51. The main control section 51 instructs the job change section 63 to change the number of copies included in a corresponding image-forming job. The job change section 63 changes the number of copies included in the image-forming job and registered in the job storage 52.

When changing the output destination of a document, which is designated, for example, as the printer 4-1, the user at first operates the input device 35 to request the machine information of another printer **4-2-4-*m*. At this time, in the client terminal 3-1, the main control section 31 creates a server search command for the printer server 2-1, and outputs it to the communication section 33. The communication section 33 transmits the server search command to the printer server 2-1 via the LAN 1**.

In the printer server 2-1, the command input section 57 inputs the server search command and supplies it to the main control section 51. The main control section 51 instructs the server search section 61 to search for the other printer servers. The server search section 61 searches for machine information stored in the machine information storage 55 of each of the other printer servers **2-2-2-*m* on the LAN 1. Then, the server search section 61 supplies the main control section 51 with machine information acquired from the other printer servers 2-2-2-*m*. The main control section 51 outputs the machine information of the other printer servers 2-2-2-*m* to the machine information output section 59. The machine information output section 59 supplies the communication section 53 with the machine information of the other printer servers 2-2-2-*m* received from the main control section 51. The communication section 53 transmits, via the LAN 1, the information received from the machine information output section 59, to the client terminal 3-1** as the originator of the server search command.

As a result, a list of the machine information of the printer servers **2-1-2-*m* is displayed on the display 36 of the client terminal 3-1. On the basis of the machine information of the other printer servers 2-2-2-*m*, the user selects a printer suitable as a new destination for outputting a document. Subsequently, the user operates the input device 35 to return the screen of the display 36 to the list of image-forming-job information. At this time, the user operates the input device 35** to select, from the list of image-forming-job information, job information on the document whose output destination is to be changed, and also to designate a printer as a new destination for outputting the document.

Suppose here that the user has designated the printer 4-2 as a new document-output destination. At this time, in the client terminal 3-1, the main control section 31 creates a job-output-destination change command for changing the output destination of the selected document to the printer 4-2, and outputs it to the communication section 33. The communication section 33 transmits the job-output-destination change command to the printer server 2-1 via the LAN 1.

In the printer server 2-1, the command input section 57 inputs the job-output-destination change command and supplies it to the main control section 51. The main control section 51 requires, of the job managing section 62, an image-forming job corresponding to the document whose output destination has been changed. The job managing section 62 extracts, from the job storage 52, the image-forming job required by the main control section 51. Then, the job managing section 62 supplies the main control section 51 with the image-forming job extracted from the job storage 52. The main control section 51 outputs the image-forming job received from the job managing section 62, to the job transfer section 60. After that, the main control section 51 instructs the job transfer section 60 to transfer the image-forming job to the printer server 2-2 that controls the printer 4-2. Upon receiving the instruction from the main control section 51, the job managing section 60 transfers the image-forming job to the printer server 2-2 via the LAN 1. After finishing the transfer of the image-forming job to the printer server 2-2, the job managing section 60 informs the main control section 51 of the end of transfer of the image-forming job. Upon receiving a signal indicative of the end of the transfer from the job transfer section 60, the main control section 51 instructs the job managing section 62 to delete the image-forming job. Upon receiving an instruction to delete the image-forming job, the job managing section 62 deletes the image-forming job registered in the job storage 52.

Thus, the printer server 2-1 for managing the first printer 4-1 sequentially stores, in the job storage 52, image-forming jobs issued from each client terminal **3-1-3-*n*. When the printer server 2-1 has received a command to display image-forming jobs (a job display command) from, for example, the client terminal 3-1, it causes the display 36 of the client terminal 3-1 to display image-forming job information stored in the job storage 52. Further, when the printer server 2-1 has received, from, for example, the client terminal 3-1, a command to change an image-forming-job-output destination (a job-output-destination change command), it extracts, from image-forming jobs stored in the job storage 52, an image-forming job, a change command for which has been issued. After that, the printer server 2-1 transfers, via the LAN 1, the extracted image-forming job to the printer server 2-2 for managing the second printer 4-2** designated as an output destination.

Accordingly, the user of each client terminal **3-1-3-*n* can transfer, by a simple procedure, an image-forming job registered in the printer server 2-1 for managing the first printer 4-1, to the printer server 2-2 for managing the second printer 4-2, via the LAN 1**.

As a result, if, for example, the user realizes that the wrong printer has been mistakenly designated to print out a document, they can easily change the designated printer. Furthermore, even if a printer designated as an output destination malfunctions and cannot execute printing, the user can transfer the print operation to another printer without executing a re-registration operation of an image-forming job for the document.

In the embodiment, when the printer server 2-1 has received, from, for example, the client terminal 3-1, a command to display the machine information of the other printers **4-2-4-*m* (a server search command), it searches the machine information stored in the machine information storages 55 of the printer servers 2-2-2-*m* which manage the other printers 4-2-4-*m*, respectively. Then, the printer server 2-1 displays the machine information of the other printers 4-2-4-*m* on the display 36 of the client terminal 3-1**.

Thus, the user of each client terminal **3-1-3-*n* can easily confirm the machine information of the other printers 4-2-4-*m***. As a result, when changing a document-output destination, the user can select a most-convenient second printer and designate it as a document-output destination. For example, the user can designates, as the second printer, the closest unused printers.

In the embodiment, when the printer server 2-1 has received a command to change an image-forming job (a job-information change command) from, for example, the client terminal 3-1, it changes the contents of the image-forming job that is included in the image-forming jobs stored in the job storage 52.

Thus, the user of each client terminal **3-1-3-*n* can also change information, such as the number of copies, contained in an image-forming job that is registered in each printer server 2-1-2-*m***.

The present invention is not limited to the above-described embodiment.

For example, although, in the embodiment, printers are used as image-forming apparatuses, the invention is also applicable to an image-forming-job managing apparatus for managing an image-forming apparatus such as a copy machine or a facsimile apparatus, etc. Further, in another embodiment, the invention could be applied to a multifunctional printer equipped with an image-forming function and an image-forming-job managing function, or to multifunction peripherals (MFP), etc.

Figure 11:
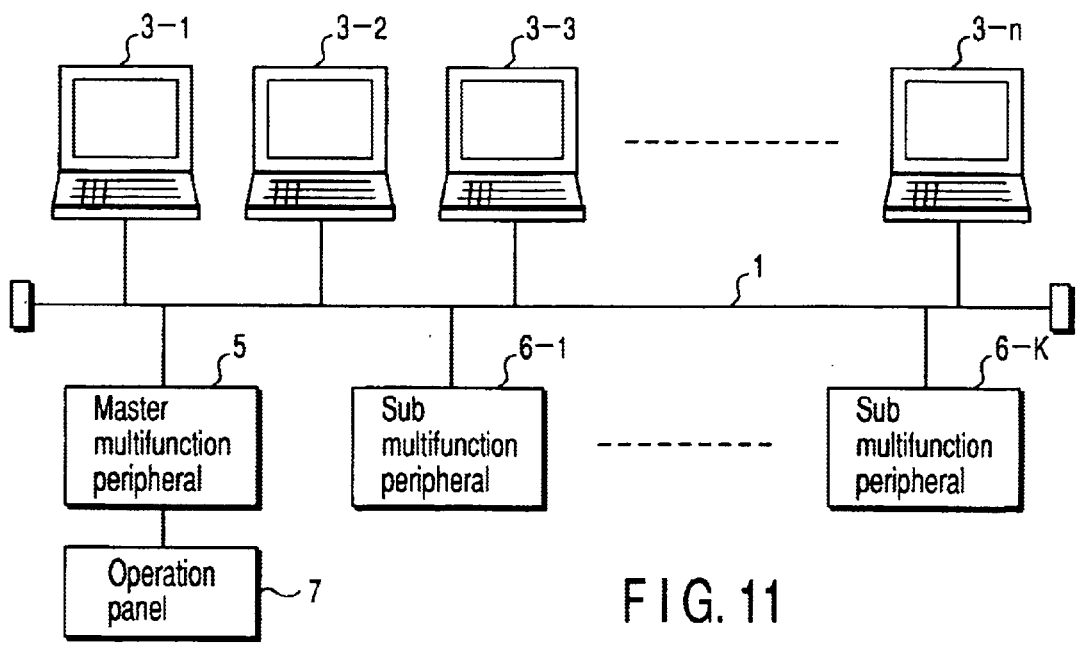
FIG. 11 is a block diagram showing an essential configuration of an image-forming system including an image-forming job managing apparatus according to another embodiment of the invention.

FIG. 11 shows an image-forming system according to another embodiment, in which the invention is applied to multifunction peripherals. This image-forming system is configured such that a master multifunction peripheral 5, a plurality of sub multifunction peripherals **6-1-6-*k* and a plurality of client terminals 3-1-3-*n* are connected to each other via the LAN 1. The master multifunction peripheral 5 is connected to an operation panel 7** equipped with an input device and a display.

In this image-forming system, when each client terminal **3-1-3-*n* has been instructed to print out a document, it creates an image-forming job for the document. Then, each client terminal 3-1-3-*n* transmits the image-forming job to the master multifunction peripheral 5 via the LAN 1. The master multifunction peripheral 5 registers the image-forming job received from each client terminal 3-1-3-*n* in a queue and manages it. After that, the master multifunction peripheral 5** executes an image-forming process on the basis of the image-forming job registered in the queue.

In this image-forming system, a user can supply an instruction to the master multifunction peripheral 5 by operating the operation panel 7. For example, when a user has operated the operation panel 7 to request image-forming jobs registered in the queue of the master multifunction peripheral 5, a list of image-forming-job information is displayed on the display of the operation panel 7. After that, when the user has operated the operation panel 7 to request machine information of each sub multifunction peripheral **6-1-6-*k*, a list of machine information of each sub multifunction peripheral 6-1-6-*k* is displayed on the display of the operation panel 7. After that, when the user has operated the operation panel 7 to request the change of the output destination of an image-forming job, the master multifunction peripheral 5** transfers the image-forming job to a sub multifunction peripheral designated as a new output destination, via the LAN 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-forming-job managing apparatus for managing an image forming job between a terminal and an image forming apparatus, comprising:
   a communication section configured to execute communication between the terminal and another image-forming-job managing apparatus via a communication line;
   a job storage section configured to store the image forming job issued from the terminal; and
   a job transfer section configured to transfer the image forming job stored in the job storage section to said another image-forming-job managing apparatus via the communication section based on an output destination change command, which requests a change of an output destination of the image forming job stored in the job storage section when the output destination change command is issued by the terminal.

2. The image-forming-job managing apparatus according to claim 1, further comprising:
   a server search section configured to obtain machine information of another image forming apparatus managed by said another image-forming-job managing apparatus based on a server search command, which requests machine information of the image forming apparatus and is issued by the terminal, and
   a machine information output section configured to transmit the machine information, obtained by the server search section, to the terminal via the communication section.

3. The image-forming-job managing apparatus according to claim 2, further comprising:
   a job management section configured to transmit a print control information of the image forming job stored in the job storage section to the terminal via the communication section based on a job display command, which requests the print control information of the image forming job and is issued by the terminal.

4. The image-forming-job managing apparatus according to claim 2, further comprising:
   a job change section configured to change information of the image forming job stored in the job storage section based on a job information change command, which requests a change of information of the image forming job and is issued by the terminal.

5. The image-forming-job managing apparatus according to claim 2, further comprising:
   a machine information storage section configured to store machine information of said another image forming apparatus, as well as corresponding machine information of other image forming apparatuses also communicatively connected to the communication line.

6. The image-forming-job managing apparatus according to claim 5, wherein the machine information includes:
   location information of corresponding printers managed by the image forming apparatuses; and
   number of jobs waiting for printing for the corresponding printers managed by the image forming apparatuses,
   wherein the machine information of all of said image forming apparatuses can be sent to the terminal upon a request made to the image forming apparatus by the terminal.

7. The image-forming-job managing apparatus according to claim 1, further comprising:
   a job change section configured to change information of the image forming job stored in the job storage section based on a job information change command, which requests a change of information of the image forming job and is issued by the terminal.

8. The image-forming-job managing apparatus according to claim 1, further comprising:
   a job management section configured to transmit a print control information of the image forming job stored in the job storage section to the terminal via the communication section based on a job display command, which requests the print control information of the image forming job and is issued by the terminal.

9. The image-forming-job managing apparatus according to claim 8, further comprising:
   a job change section configured to change information of the image forming job stored in the job storage section based on a job information change command, which requests a change of information of the image forming job and is issued by the terminal.

10. The image-forming-job managing apparatus according to claim 1, wherein the image-forming-job managing apparatus only manages image forming jobs for the image forming apparatus, and
    wherein the another image-forming-job managing apparatus only manages image forming jobs for another image forming apparatus for which the output destination change command requests that the image forming job be performed by.

11. The image-forming-job managing apparatus according to claim 1, further comprising:
    a control section for determining whether or not the image forming job has been correctly transferred to and received by the another image-forming-job managing apparatus,
    wherein the image forming job stored in the job storing section of the image-forming-job managing apparatus is only deleted from the job storing section after the control section determines that the image forming job has been correctly transferred to and received by the another image-forming-job managing apparatus.

12. The image-forming-job managing apparatus according to claim 1, further comprising:
    a machine information output section configured to obtain machine information stored at all other image-forming job managing apparatuses, based on a machine information command output from the terminal and received by the image-forming-job managing apparatus,
    wherein the machine information output section outputs the obtained machine information of the other image-forming job managing apparatuses, along with machine information of the image-forming-job managing apparatus, to the terminal.

13. The image-forming-job managing apparatus according to claim 12, wherein the machine information comprises:
    name designation of the corresponding image forming apparatus managed by each of the image-forming-job-managing apparatuses;

current operating status of the corresponding image forming apparatus managed by each of the image-forming-job-managing apparatuses;

number of jobs waiting for printing of the corresponding image forming apparatus managed by each of the image-forming-job-managing apparatuses; and location of the corresponding image forming apparatus managed by each of the image-forming-job-managing apparatuses.

14. The image-forming-job managing apparatus according to claim 13, wherein all of the image-forming-job managing apparatuses are communicatively connected to each other via a local area network.

15. An image-forming-job managing apparatus for managing an image-forming job between a terminal and an image forming apparatus, comprising:

communication means for executing communication between the terminal and another image-forming job managing apparatus via a communication line;

storage means for storing the image forming job issued from the terminal; and transferring means for transferring the image forming job stored in the storage means to said another image-forming job managing apparatus via the communication means based on a job output destination change command, which requests a change of the output destination of the image forming job stored in the storage means when the output destination change command is issued by the terminal.

16. The image-forming-job managing apparatus according to claim 15, further comprising:

changing means for changing information of the image forming job stored in the storage means based on a job information change command, which requests a change of information of the image forming job and is issued by the terminal.

17. The image-forming-job managing apparatus according to claim 15, further comprising:

obtaining means for obtaining machine information of another image forming apparatus managed by said another image-forming-job managing apparatus based on a server search command, which requests machine information of the image forming apparatus and is issued by the terminal; and transmitting means for transmitting the machine information, obtained by the obtaining means, to the terminal via the communication means.

18. The image-forming-job managing apparatus according to claim 17, further comprising:

changing means for changing information of the image forming job stored in the storage means based on a job information change command, which requests a change of information of the image forming job and is issued by the terminal.

19. A method of managing an image forming job performed in an image-forming-job managing apparatus, for managing an information forming job between a terminal and an image forming apparatus, comprising:

executing communication between the terminal and another image forming-job managing apparatus via a communication line;

storing the image forming job issued from the terminal in a storage section; and transferring the image forming job to said another image-forming-job managing apparatus via the communication line based on a job output destination change command, which requests a change of an output destination of the image forming job stored in the storage section when the output destination change command is issued by the terminal.

20. The method of managing an image forming job according to claim 19, further comprising:

obtaining machine information of another image forming apparatus based on a server search command, which requests machine information of the image forming apparatus and is issued by the terminal; and transmitting the machine information to the terminal.

* * * * *